(12) United States Patent
Doran et al.

(10) Patent No.: US 7,668,945 B2
(45) Date of Patent: Feb. 23, 2010

(54) NETWORK BOOTING USING A PLATFORM MANAGEMENT COPROCESSOR

(75) Inventors: Mark S. Doran, Olympia, WA (US); Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 11/506,738

(22) Filed: Aug. 18, 2006

(65) Prior Publication Data

US 2008/0046548 A1   Feb. 21, 2008

(51) Int. Cl.
G06F 15/177 (2006.01)
G06F 9/00 (2006.01)
G06F 9/24 (2006.01)
H04L 9/32 (2006.01)

(52) U.S. Cl. ............................. 709/222; 713/1; 713/180

(58) Field of Classification Search ...................... 713/2, 713/1; 712/34; 709/220–222
See application file for complete search history.

(56) References Cited

U.S. PATENT DOCUMENTS

| | | | | |
|---|---|---|---|---|
| 5,844,986 A | * | 12/1998 | Davis | ......................... 713/187 |
| 5,937,063 A | * | 8/1999 | Davis | ......................... 713/187 |
| 6,185,678 B1 | * | 2/2001 | Arbaugh et al. | ................. 713/2 |
| 6,871,210 B1 | * | 3/2005 | Subramanian | ............... 709/203 |
| 7,281,127 B2 | * | 10/2007 | Rothman et al. | ................. 713/2 |
| 7,392,399 B2 | * | 6/2008 | Grohoski et al. | ............ 713/189 |
| 2005/0071677 A1 | * | 3/2005 | Khanna et al. | .............. 713/201 |
| 2006/0056630 A1 | * | 3/2006 | Zimmer et al. | .............. 380/256 |
| 2006/0143432 A1 | * | 6/2006 | Rothman et al. | ................. 713/2 |
| 2007/0300044 A1 | * | 12/2007 | Moyer et al. | ................... 712/34 |

* cited by examiner

*Primary Examiner*—Joseph E Avellino
*Assistant Examiner*—Catherine Thiaw
(74) *Attorney, Agent, or Firm*—Blakely, Sokoloff, Taylor & Zafman LLP

(57) ABSTRACT

Embodiments of a system and method for enabling a target computer to download a boot image and operating system from a boot server computer over a network are described. The target computer system includes a host processor environment and a platform management coprocessor subsystem that includes a microcontroller for providing manageability of the target computer platform. During a network boot procedure, the platform management coprocessor code employs a network access channel to retrieve the boot server name and a network address for the target computer. The platform management coprocessor code implements security measures to help ensure secure interaction between the boot server and the target computer. Once the secure association is established, the network boot process uses the BIOS code for the successive bulk downloads of the operating system to be loaded onto the target computer. Other embodiments are described and claimed.

14 Claims, 4 Drawing Sheets

NETWORK BOOTING USING A PLATFORM MANAGEMENT COPROCESSOR

FIELD OF THE INVENTION

Embodiments are in the field of computer networks, and particularly in the field of booting computing devices over a network.

BACKGROUND OF THE DISCLOSURE

Embedded systems, such as diskless workstations can incorporate various types of utility software for booting over a network. As network and processing tasks are divided among different processing components on a CPU (central processing unit) motherboard, different routines are often configured to perform different tasks related to network access and booting. For example, a Pre-Boot Execution Environment (PXE), such as that defined by the Unified Extensible Firmware Interface (UEFI) specification (http://www.uefi*org) has been developed to provide firmware utilities and CPU BIOS (Basic Input/Output System) functionality. Other programs, such as the Intel® Active Management Technology (AMT) (http://intel*com/technology/manage/iamt/) have been developed to provide improved networking capabilities (note the previous URL addresses have substituted a "*" in place of a period). One issue related to the division of tasks between different bodies of code is that each body of code typically does not provide the services provided by the other body of code, and they may not collaborate sufficiently well to speed the boot process in many network implementations.

In general, PXE code (and variations thereof) represents an in-band BIOS (Basic Input/Output System) firmware regime that provides a pre-boot execution environment for a host CPU. As such, it is a relatively minimal body of code that typically does not have sufficient networking capabilities until relatively late in the boot process. Furthermore, the PXE code usually does not have enough flash space to support all network authentication protocols. The Intel® AMT firmware, in contrast, typically carries a full network stack to support various web services. These network protocols include TCP/IP (Transmission Control Protocol/Internet Protocol), HTTP (Hypertext Transport Protocol), and SSL/TLS (Secure Sockets Layer/Transport Layer Security). At present, when implemented on the same computer, these two execution domains collaborate to a limited extent during the pre-boot stage. After pre-boot, however, the two execution regimes are largely separate and do not collaborate with one another.

In a typical implementation, the Intel® AMT code is executed on a co-processor platform within the host CPU system. For an AMT-only boot scenario, such as IDE-Redirection (IDE-R) for Integrated Drive Electronics (IDE) devices, the AMT program is constrained by the network throughput of the out-of-band microcontroller subsystem.

The PXE (BIOS) boot is generally faster since it runs on the in-band CPU and is advantaged by the ever-increasing speed of current microprocessors. However, the BIOS PXE boot is constrained by the capacity; of flash memory and typically cannot bear the cost of implementing the certain stacks, such as TLS/SSL. In many present systems, the PXE process occurs late in the Power-On/Self-Test (POST) process since it requires main memory to be initialized and tested, the I/O bus to be resource balanced, and the network interface controller driver to be installed in BIOS/firmware. There may also be a required timeout the protocol to implement a server name request. With regard to authentication, current PXE authentication schemes are weak because it is difficult to carry security mechanisms, such as a full SSL/TLS stack in BIOS.

DETAILED DESCRIPTION

Embodiments described herein provide faster and more secure network booting for diskless workstations and embedded computing devices. The network booting procedure enables a target computer to download a boot image and operating system from a boot server computer over a network. The target computer system includes a host CPU environment and a platform management coprocessor (PMC) subsystem that includes a microcontroller for providing manageability of the target computer platform. During a network boot procedure, the platform management coprocessor code employs a network access channel to retrieve the boot server name and a network address, among other information, for the target computer. The platform management coprocessor code implements security measures to help ensure secure interaction between the boot server and the target computer. Once the secure interface between the boot server and target computer is established, the network boot process uses the BIOS code for the successive bulk downloads of the operating system to be loaded onto the target computer.

Figure 1:
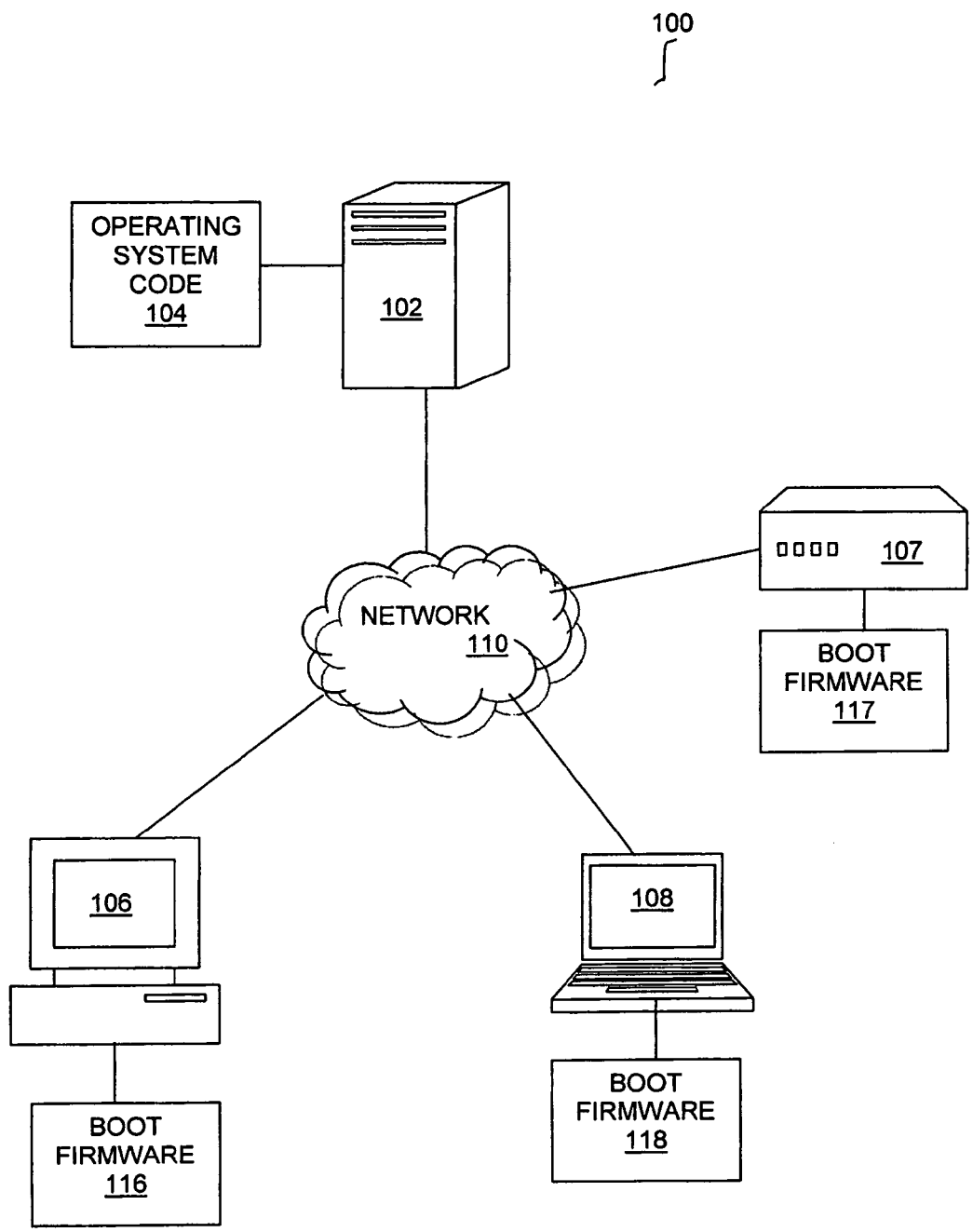
FIG. 1 is a block diagram of elements of a computer network that includes one or more computers executing a network boot process, according to an embodiment.

Aspects of the one or more embodiments described herein may be implemented on one or more computers executing software instructions. The computers may be networked in a client-server arrangement or similar distributed computer network. FIG. 1 illustrates a computer network system 100 that implements one or more embodiments. In system 100, a boot server computer 102 is coupled, directly or indirectly, to one or more network client computers or computing devices 106, 107 and 108 through a network 110. The network interface between the server computer 102 and the client computers may include one or more routers that serve to buffer and route the data transmitted between the server and client computers, and network 110 may be the Internet, a Wide Area Network (WAN), a Local Area Network (LAN), or any combination thereof. As shown in FIG. 1, the client computing devices include a workstation computer 106, a portable computer 108, and an embedded computing device 107, but are not so limited. The client computing devices can be any class of client computer, such as a personal computer, workstation, server computer, or they can be a mobile computing or communication device, such as a notebook computer, personal digital assistant (PDA), mobile phone, game console, or any similar class of mobile computing device with sufficient processing and communication capability.

In one embodiment, such as in an embedded or enterprise network implementation, one or more of the client computers may not have an operating system image loaded on the machine itself, but instead may rely on operating system resources to be provided to it over the network 110. For this scenario, a centralized server or data center may provide a suite of different operating systems and/or application programs for download to the various client computers. As shown in FIG. 1, the server computer 102 contains the bulk of the operating system (OS) code 104, as well as any appropriate application program code, and each client or target computer includes a minimum amount of code that allows the target computer to boot itself and initiate communication with the server 102 for access and downloading of the operating system code to the target computer. In some cases the target computers may contain only a minimal amount of firmware, that is, only an amount necessary to download further firmware components from the server to allow the operating system to be downloaded to the target computer.

As shown in FIG. 1, each target computer executes a corresponding boot firmware program, thus computer 106 runs boot firmware 116, computer 107 runs boot firmware 117, and computer 108 runs boot firmware 118. Upon booting, each target computer boots up using the boot firmware. This firmware also includes communication utilities to find and download the appropriate operating system program 104 on the server computer 102. Upon startup or reset, each target computer attempts a network boot by accessing the network 110 to find the server computer with the appropriate operating system. Upon finding the proper server computer, the target computer downloads the operating system or any remaining portion of the operating system, and starts to function under the downloaded operating system.

In one embodiment, the boot firmware comprises two separate bodies of code that cooperate to boot the target computer and initiate communication with the server computer. One body of code is PXE BIOS code (or code that functions similarly to code governed by the PXE specification) that is executed on a host CPU of the target computer and provides fast boot capabilities, and the other body of code is PMC code that is executed on a co-processor resident in the target computer, and that provides secure and comprehensive network access capabilities. Upon booting by the PXE code, the PMC code initiates network access to retrieve the name and network (IP) address, and any other relevant information, of the boot server for the PXE code on the target computer using a secure hand-shake protocol. A channel of communication between the target computer and boot server is established, and the state data of the boot server required to support the connection is maintained. Once the boot server name and target IP address has been provided to the PXE code, the PXE code downloads the operating system and/or application code from the server computer. It should be noted that the PXE code may comprise code governed by the PXE specification, or it may comprise code similar BIOS type code that is not governed by the PXE specification.

Figure 2:
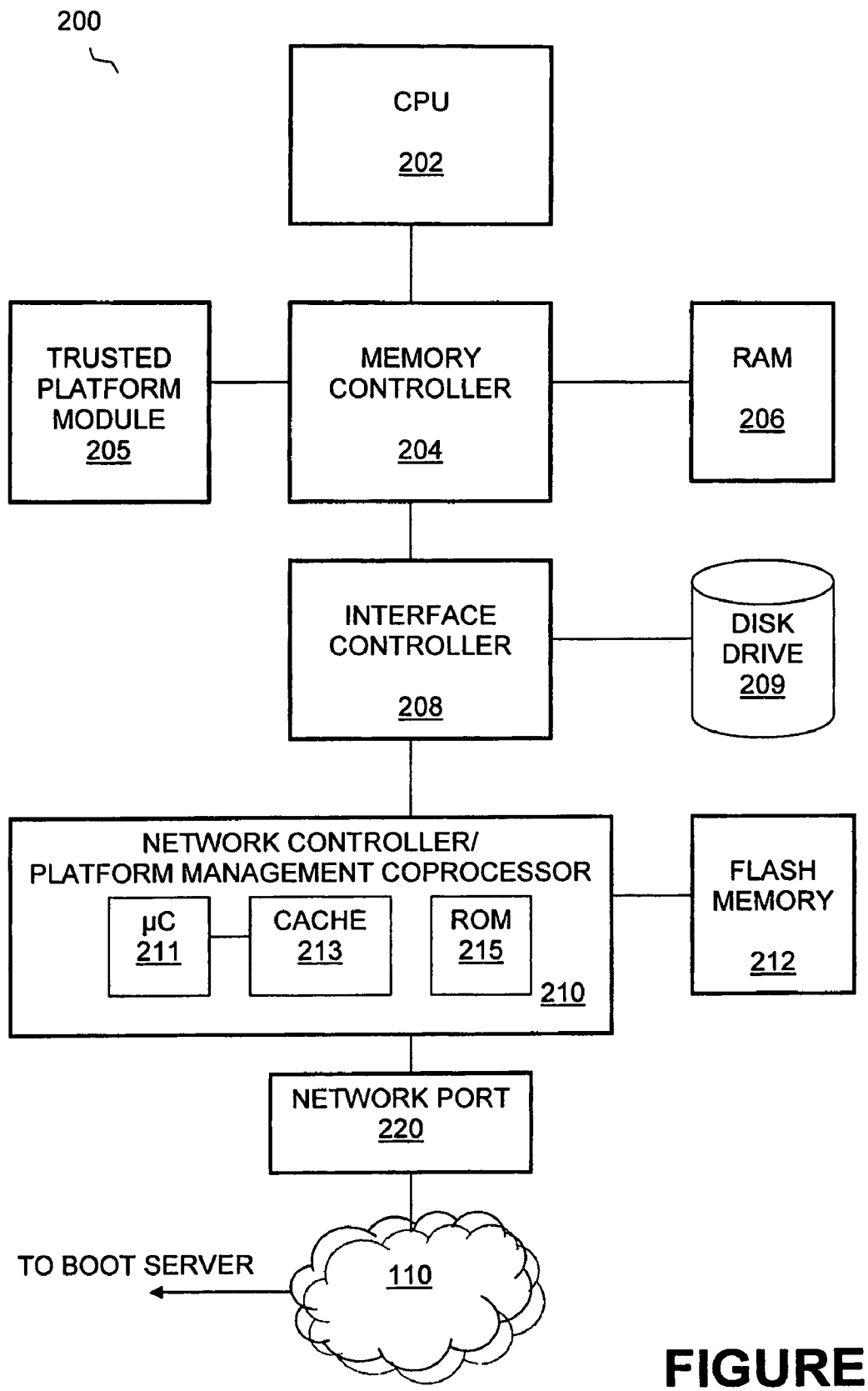
FIG. 2 is a block diagram of elements of a target computer system including a platform management coprocessor module for performing a network boot, according to an embodiment.

FIG. 2 is a block diagram of elements of a target computer system 200 configured to perform a network boot, according to an embodiment. FIG. 2 is a partial block diagram of an example of a computer hardware configuration in which embodiments of the invention may be practiced. The system 200 may represent a portion of the computer, and may be embodied on one or more motherboards, or integrated circuit devices comprising at least some of the components of the computer. As shown in FIG. 2, computer 200 includes a central processing unit (CPU) 202 (also referred to as a host CPU or host processor) coupled to a memory controller 204 and an interface controller 208. The memory controller is connected directly or indirectly to one or more on-board or off-board random access memory (RAM) devices 206. Likewise, the interface controller is connected directly or indirectly to one or more on-board or off-board peripheral devices, such as disk drive 209. The CPU is also coupled to a network controller 210, which provides access to network 110 through network port 220.

In one embodiment, computer 200 also includes a trusted platform module (TPM) 205 coupled to the memory controller 204. The TPM module 205 contains one or more registers for storing values related to authentication parameters, such as crypto hashing values, and the like. The TPM module 205 also includes an electronic signature generation engine, and other processes related to authentication functions. To ensure that any network boot is robust, the system 200 implements a mutual authentication procedure between the server and the client computer through the use of the TPM module 205. This prevents network security breaches, such as the effect of rogue interlopers, and the like.

For the embodiment shown in FIG. 2, the network controller 210 comprises a sub-processing module that contains its own microcontroller 211, ROM 215, and other memory, such as cache memory 213 for providing manageability of the network platform. The network controller 210 essentially functions as a microcontroller module that is embedded as part of a platform that is dedicated to performing manageability tasks, and is referred to herein as the platform management coprocessor (PMC). In general, the manageability structure provided by the PMC relates to processes that ensure the security of the network boot process. The PMC 210 executes PMC code that provides network access for the host CPU, as well as security mechanisms for interaction with a boot server over the network 110. Coupled to the PMC 210 is flash memory 212. In an embodiment, this memory is configured to store firmware and other BIOS code, such as the PXE code. In one embodiment, the PMC module 210 can be a circuit or sub-board that supports the Intel® AMT system, or similar platform manageability program.

In one embodiment, the PMC code is executed by the microcontroller 211 on the network controller/PMC module 210, and the PXE code is executed by the CPU 202. Both the PXE code and the PMC code can be stored in the flash memory 212 so that they are available upon start up of the target computer. Alternatively, either or both of the PMC and PXE code can be stored on other memory devices, such as ROM 215, disk drive 209, or other memory in or coupled to the computer 200.

In general, the network controller/PMC module 210 has enhanced network interface capability, but its microcontroller 211 is generally not as powerful as the host CPU 202. Although illustrated as part of the network controller 210, the microcontroller 211 could be a processor that is embedded within any other structure of the computer, such as the interface controller 208. Likewise, the PMC module 210 could be embodied as a circuit on the same motherboard that contains the host CPU, or it could be implemented in an ASIC (Application Specific Integrated Circuit) or similar programmable logic circuit within the target computer.

In general, to perform a network boot of a target computer, the network address of the target computer must be determined. For purposes of the following discussion, it is assumed that the network 110 is the Internet and that the network address is an Internet Protocol (IP) address. However, other embodiments are not so limited, and network 110 can represent any type of network that utilizes a proprietary or known address scheme.

In some cases, the IP address may be hardwired into the target computer. In many cases, however, the target computer not preconfigured with the IP address in order to facilitate flexibility in deployment and reduce pre-configuration requirements. In this case, the IP address must be provided by a separate server computer over the network. Present methods of providing an IP address to PXE client computers typically involve the use of DHCP (Dynamic Host Configuration Protocol) servers that provide IP address to requesting PXE clients over a network. Although this protocol is relatively widely implemented, it is generally not optimum for enterprise applications because of certain security holes and vulnerability to network attacks, such as spoofing. In one embodiment, the PMC code provides network access and security mechanisms to identify a boot server over the network to obtain an IP address for the target computer. The PMC code thus acts essentially as a network access utility for the PXE BIOS code on the target computer.

Figure 3:
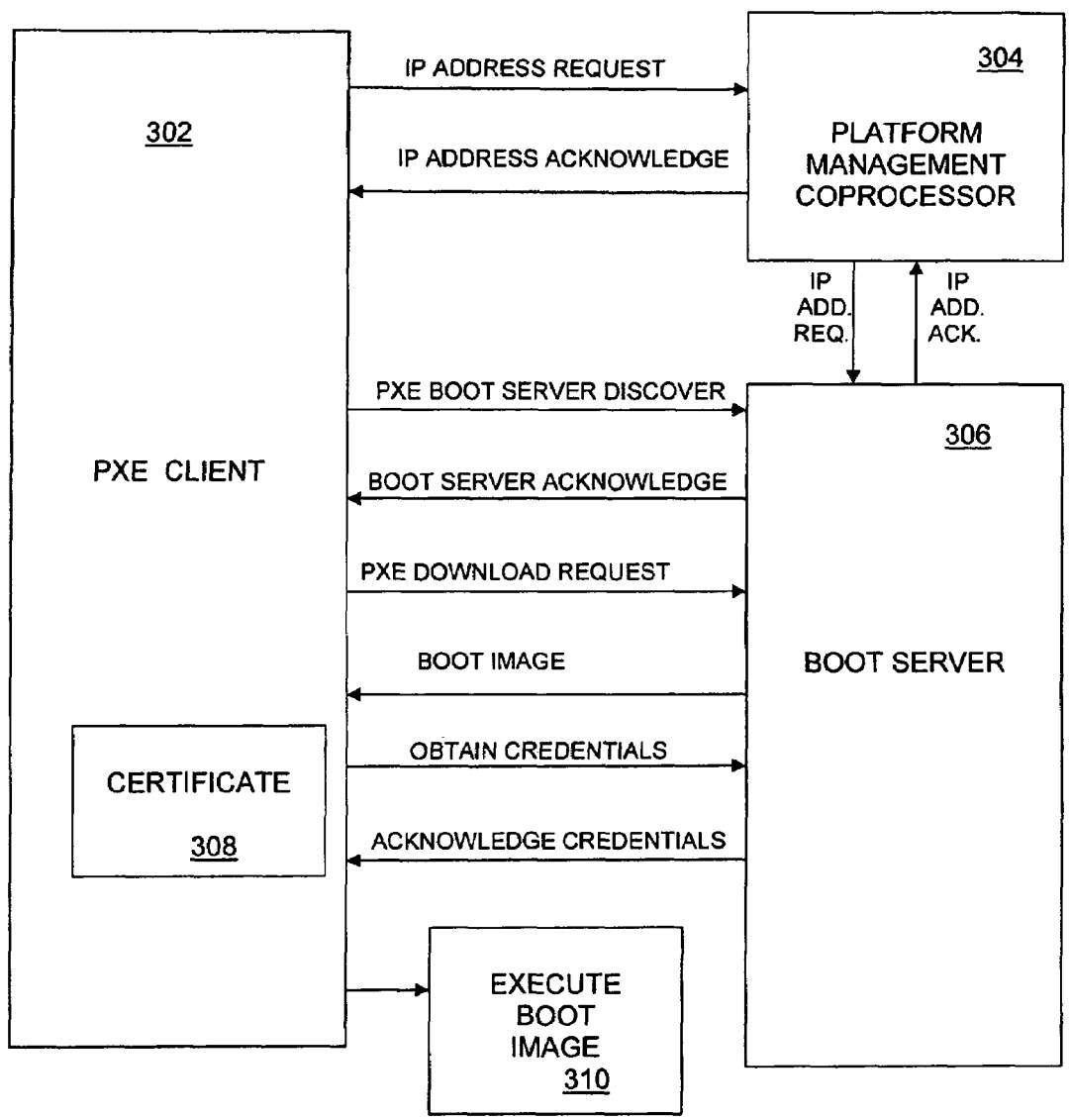
FIG. 3 is a diagram illustrating the process flow for a network boot, according to an embodiment.

FIG. 3 is a diagram illustrating the process flow for a network boot through a platform management coprocessor, according to an embodiment. For the embodiment illustrated in FIG. 3, the PXE client (or similar BIOS client) 302 represents the pre-boot execution environment executed by CPU 202 in FIG. 2. The PXE client accesses a platform management coprocessor 304 to obtain the IP address for the target computer. The PXE client 302 sends an IP address request to the platform management coprocessor 304. If the IP address is pre-configured within the coprocessor, this address is provided back to the PXE client. If, however, it is not pre-configured, the platform management coprocessor then performs its own process of retrieving an IP address over the network. The IP address can be provided by a general IP address server computer, or it could be provided by the boot server computer 306, as shown in FIG. 3. In one embodiment, the platform management coprocessor utilizes a DHCP exchange with the boot server computer 306 (or other IP address server) to determine the IP address of the boot server for the target computer. Using the DHCP protocol, the platform management coprocessor sends out a query requesting a response from a DHCP server over the network. The DHCP server then replies with its assigned IP address, subnet mask, DNS server and default gateway information. After the platform management coprocessor 304 obtains the IP address from the IP address server, it sends an IP address acknowledge signal to the PXE client. In one embodiment, the platform management coprocessor corresponds to the microcontroller circuit 211 in FIG. 2 and is in the same target computer environment as the PXE client. In this configuration, interaction between the platform management coprocessor 304 and the PXE client 302 with regard to the IP address is conducted in a secure environment and under tight control.

Along with the target IP address, the PMC code also obtains the name or other network identifier of the boot server that contains the operating system to be loaded onto the target computer. Once the IP address and boot server name have been obtained by the PXE client 302, the PXE client 302 proceeds with the downloading of the operating system code from the boot server 306 over the network. The operating system code could include portions of a boot program to further initialize the target computer or any utilities or application programs required for target computer operation. This process begins with the PXE client 302 transmitting a PXE boot server discover signal over the network. The appropriate boot server 306 then sends back a boot server acknowledge signal. The PXE client 302 transmits a download request, and the boot server 306 responds by transmitting a boot image back to the PXE client 302. The PXE client 302 may contain a security certificate 308, and to ensure security of the exchange, the PXE client 302 and boot server 306 typically exchange security credentials. Once the security credentials are checked and the boot image is downloaded, the PXE client 302 can then execute the boot image 310.

Figure 4:
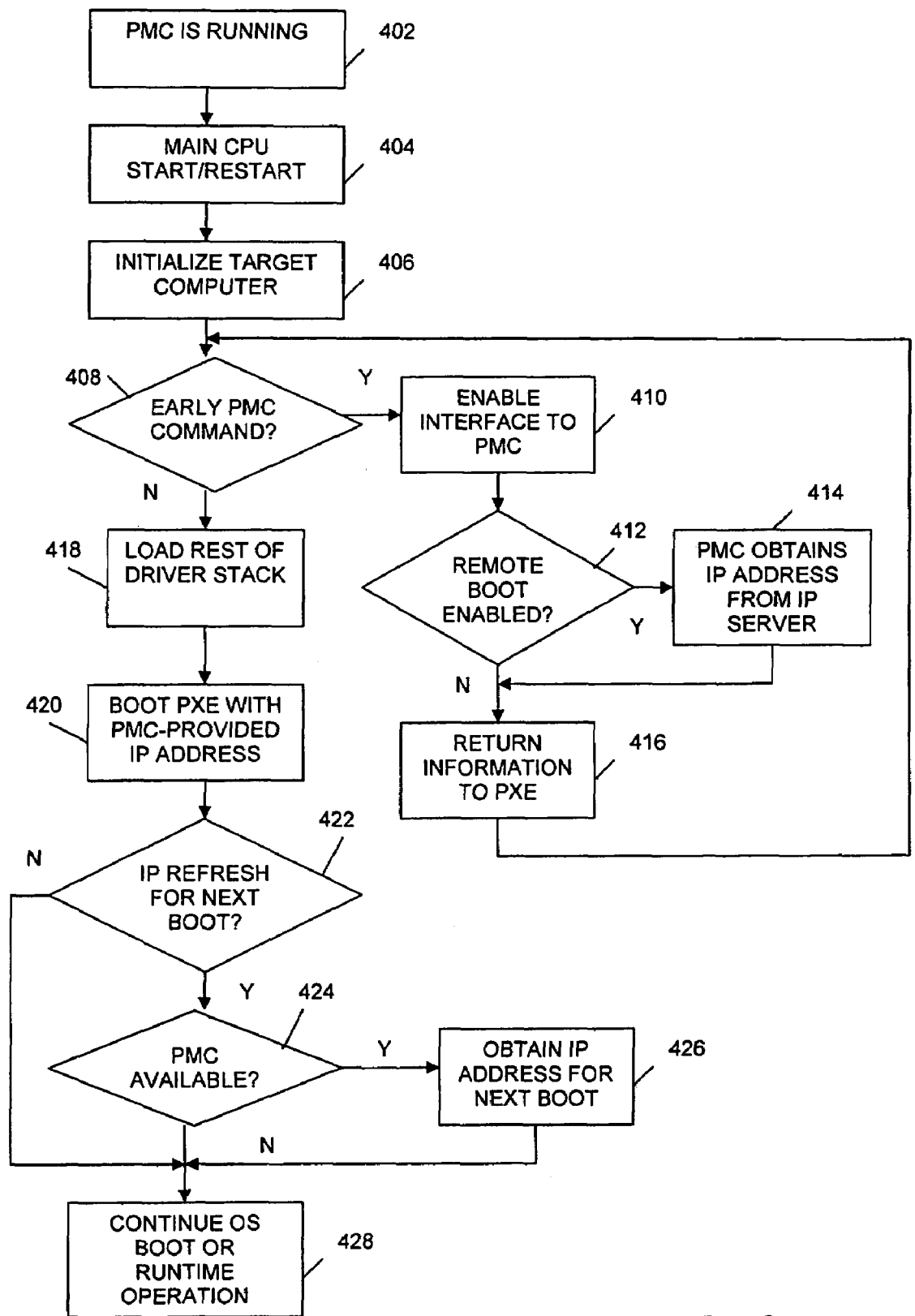
FIG. 4 is a flow diagram of a method of performing a network boot through a combined BIOS and platform management coprocessor program code or logic, according to an embodiment.

FIG. 4 is a flow diagram of a method of performing a network boot through a combined BIOS and platform management coprocessor program, according to an embodiment. For the embodiment of FIG. 4, the PMC program code (or logic) runs on a co-processor module 210 that is separate from the host CPU 202 of the target computer, as shown in FIG. 2. This allows the PMC to be in an always-on/always-connected mode. As shown in block 402, the process starts with the PMC code already running. Upon a start or restart (reboot) sequence 404 of the host CPU, the target computer is initialized, 406. This typically involves initializing the processors, memory and interface controllers, configuring the caches, and so on.

In one embodiment, the PMC code utilizes the DHCP protocol to access the boot server. The PMC can start a DHCP request process early. Thus, in block 408, the system determines whether the PMC initiates an early command. If so, an interface between the PXE client and the PMC is enabled, 410. Next, the system checks whether or not a remote boot is enabled, block 412. If not, the system goes directly to returning information to the PXE client when it is ready, and then waiting for the next PMC command. If the remote boot is enabled, as determined in step 412, the PMC accesses the network to obtain the server name and boot server IP address for the target computer, 414. The PMC code can employ an SSL/TLS channel to cover the web services and retrieve the server name for the PXE client. This mechanism prevents the direct use of an unsecured DHCP exchange from the PXE BIOS directly. Once the boot server name and the IP address of the target computer is obtained, this information is provided to the PXE BIOS, as shown in block 416. The process then continues with a memory test and the loading of the rest of the driver stack, 418, after a determination of an early PMC command, block 408.

Once the PMC code has made a secure access to the boot server, the boot process exclusively uses the BIOS PXE code for the successive bulk downloads. Thus, in block 420, the target computer performs a PXE boot with the server address provided by the PMC code.

As shown in FIG. 4, the AMT is in an always-on/always-connected mode and can continually make a DHCP request, and so can be in a state of anticipation of a reboot with the server address being ready for successive PXE action. In block 422, the process determines whether or not the PMC IP is refreshed for the next boot. If not, the process continues with the present OS boot procedure 428; if so, the process checks whether the PMC is available, block 424. If so, the PMC causes the target computer to contact a remote authority or resource to obtain the IP address for the next boot, 426. The process then continues the operating system boot procedure and/or the runtime operation, 428.

Although FIG. 4 illustrates an embodiment in which the PMC code interacts with the boot server using the DHCP protocol, other secure transmission protocols can also be used to enable the target computer to obtain an IP address and server name for use by the BIOS code. Other possible transmission protocols include web services, TCP/IP interfaces, and the like.

For the purposes of the present description, the term "processor" or "CPU" refers to any machine that is capable of executing a sequence of instructions and should be taken to include, but not be limited to, general purpose microprocessors, special purpose microprocessors, application specific integrated circuits (ASICs), multi-media controllers, digital signal processors, and micro-controllers, etc.

The memory associated with system 200 may be embodied in a variety of different types of memory devices adapted to store digital information, such as static random access memory (SRAM), dynamic random access memory (DRAM), synchronous dynamic random access memory (SDRAM), and/or double data rate (DDR) SDRAM or DRAM, and also non-volatile memory such as read-only memory (ROM). Moreover, the memory devices may further include other storage devices such as hard disk drives, floppy disk drives, optical disk drives, etc., and appropriate interfaces. The system may include suitable interfaces to interface with I/O devices such as disk drives, monitors, keypads, a modem, a printer, or any other type of suitable I/O devices.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Implementations may also include microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

While the term "component" is generally used herein, it is understood that "component" includes circuitry, components, modules, and/or any combination of circuitry, components, and/or modules as the terms are known in the art.

The various components and/or functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples for, the systems and methods are described herein for illustrative purposes, various equivalent modifications are possible, as those skilled in the relevant art will recognize. The teachings provided herein may be applied to other systems and methods, and not only for the systems and methods described above. The elements and acts of the various embodiments described above may be combined to provide further embodiments. These and other changes may be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. Accordingly, the inventors reserve the right to add additional claims after filing the application to pursue such additional claim forms for other aspects as well.

What is claimed is:

1. A method comprising:
   executing pre-boot execution logic on a host processor of a target computer to boot the host processor, the pre-boot execution logic to
      send, to a co-processor module of the target computer, a request to obtain an network address for the target computer, and
      download an operating system code when provided a boot server name and network address;
   executing platform management logic on the co-processor module of the target computer to
      receive the request to obtain a network address for the target computer,
      determine whether a network address is pre-configured within the coprocessor, and if so, provide the network address to the host processor,
      obtain a name and network address of a boot server coupled to the target computer over a network,
      initiate a secure handshake process with the boot server, the handshake process to include an exchange of a security certificate between the target computer and the boot server, and
      establish a secure channel of communication between the target computer and the boot server using the security certificate;
   providing the boot server name and network address to the pre-boot execution logic;
   downloading, via the communication channel, the operating system code from the boot server to the target computer using the pre-boot execution logic; and
   performing a network boot of the operating system on the target computer.

2. The method of claim 1, further comprising the platform management logic executing a Dynamic Host Configuration Protocol procedure to interact with the boot server.

3. The method of claim 2, wherein the network comprises the Internet, and the network address comprises an Internet Protocol address.

4. The method of claim 3, further comprising the platform management logic executing a web services transaction to obtain the server name of the boot server.

5. The method of claim 1, wherein the co-processor module is selected from the group consisting of a co-processor component resident on a board integral with the host processor, and a programmable logic circuit separate from the host processor and within the target computer.

6. A non-transitory computer-readable storage medium having stored thereon instructions which, when executed in a system, causes the system to perform the operations of:
   executing pre-boot execution logic on a host processor of a target computer to boot the host processor, the pre-boot execution logic to
      send, to a co-processor module of the target computer, a request to obtain an network address for the target computer and
      download an operating system code when provided a boot server name and network address;
   executing platform management logic on the co-processor module of the target computer to
      receive the request to obtain a network address for the target computer,
      determine whether a network address is pre-configured within the coprocessor, and if so, provide the network address to the host processor,
   obtain a name and network address of a boot server coupled to the target computer over a network,
      initiate a secure handshake process with the boot server, the handshake process to include an exchange of a security certificate between the target computer and the boot server, and
      establish a secure channel of communication between the target computer and the boot server using the security certificate;
   providing the boot server name and network address to the pre-boot execution logic;
   downloading, via the communication channels the operating system code from the boot server to the target computer using the pre-boot execution logic; and
   performing a network boot of the operating system on the target computer.

7. The non-transitory computer-readable storage medium of claim 6, further comprising instructions that cause the system to perform the operation of the platform management logic executing a Dynamic Host Configuration Protocol-procedure to interact with the boot server.

8. The non-transitory computer-readable storage medium of claim 7, wherein the network comprises the internet, and the network address comprises an Internet Protocol address.

9. The non-transitory computer-readable storage medium of claim 8, wherein the platform management logic executes a web services transaction to obtain the server name of the boot server.

10. An apparatus comprising;
   a host processor including pre-boot execution logic to
      boot the host processor,
      send, to a co-processor module of the target computer, a request to obtain an network address for the target computer, and
      in response to receiving the network address from the co-processor module,
         download an operating system code from a boot server via a communication channel, the boot server coupled to the apparatus over a network, and
         perform a network boot of the operating system; and
   a co-processor module including platform management logic, the co-processor module, in response to receiving the request to obtain a network address for the target computer from the host processor, to
      determine whether a network address is pre-configured within the coprocessor, and if so, provide the network address to the host processor,
      obtain a name and network address of the boot server,
      initiate a secure handshake process with the boot server, the handshake process to include an exchange of a security certificate between the target computer and the boot server,
      provide the boot server name and network address to the host processor, and
      establish a secure channel of communication between the target computer and the boot server using the security certificate.

11. The apparatus of claim 10, wherein the platform management logic executes a Dynamic Host Configuration Protocol procedure to interact with the boot server.

12. The apparatus of claim 10, wherein the network comprises the Internet, and the network address comprises an Internet Protocol address.

13. The apparatus of claim 12, wherein the platform management logic executes a web services transaction to obtain the server name of the boot server.

14. The apparatus of claim 10, wherein the co-processor module is selected from the group consisting of a co-processor component contained on a board integral with the host processor, and a programmable logic circuit separate from the host processor and within the target computer.

* * * * *

UNITED STATES PATENT AND TRADEMARK OFFICE
CERTIFICATE OF CORRECTION

PATENT NO. : 7,668,945 B2
APPLICATION NO. : 11/506738
DATED : February 23, 2010
INVENTOR(S) : Doran et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 691 days.

Signed and Sealed this

Twenty-eighth Day of December, 2010

David J. Kappos
*Director of the United States Patent and Trademark Office*